(12) United States Patent
Focazio et al.

(10) Patent No.: US 7,225,202 B2
(45) Date of Patent: May 29, 2007

(54) METHOD AND APPARATUS FOR GENERATING QUERY AND RESPONSE STATEMENTS AT RUNTIME FROM GENERIC REQUESTS

(75) Inventors: Robyn Lee Focazio, Round Rock, TX (US); Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 10/803,658

(22) Filed: Mar. 18, 2004

(65) Prior Publication Data

US 2005/0210004 A1  Sep. 22, 2005

(51) Int. Cl.
*G06F 17/00* (2006.01)
(52) U.S. Cl. .............................. 707/103 Y; 707/103 R
(58) Field of Classification Search ................ 707/1, 707/100; 715/513
See application file for complete search history.

(56) References Cited

U.S. PATENT DOCUMENTS

| | | | |
|---|---|---|---|
| 6,356,906 B1 | 3/2002 | Lippert et al. | |
| 6,356,907 B1 | 3/2002 | Hopmann | |
| 6,418,448 B1 | 7/2002 | Sarkar | |
| 6,449,620 B1 | 9/2002 | Draper et al. | |
| 6,611,843 B1 | 8/2003 | Jacobs | |
| 6,801,915 B1 | 10/2004 | Mack | |
| 2002/0120685 A1 | 8/2002 | Srivastava et al. | |
| 2003/0050932 A1 | 3/2003 | Pace et al. | |
| 2004/0024888 A1 | 2/2004 | Davis et al. | |
| 2004/0181537 A1* | 9/2004 | Chawla et al. | 707/100 |
| 2005/0216498 A1 | 9/2005 | Georgalas et al. | |

OTHER PUBLICATIONS

Focazio et al., Method and Apparatus for Validating and Configuring Database Transaction Requests from Multiple Clients, Jan. 14, 2004.
Focazio et al., Method and Apparatus for Splitting and Merging Request and Response Data at Runtime.

* cited by examiner

*Primary Examiner*—Alford W. Kindred
(74) *Attorney, Agent, or Firm*—Duke W. Yee; David A. Mims, Jr.; Mary Adams-Moe

(57) ABSTRACT

A method, apparatus, and computer instructions of generating SQL statements at run time from generic and abstract XML request and response messages is provided. A set of generic and abstract XML schemas are provided for a client to send request XML messages for performing actions on information of objects in a data store. An adaptor processes the request XML messages and generates the SQL statements to submit to the data store. Upon receiving results, the adaptor sends response XML messages that adhere to the generic and abstract XML schemas to the client, which then obtains values of results from response XML message.

17 Claims, 10 Drawing Sheets

FIG. 6A

```xml
<?xml version="1.0" encoding="UTF-8"?>
<xsd:schema version="1.0" xml:lang="en-US"
    targetNamespace="http://www.ibm.com/esm"
    xmlns:xsd="http://www.w3.org/2001/XMLSchema" xmlns="http://www.ibm.com/esm"
    xmlns:etcML="http://www.ibm.com/v1/etcML" elementFormDefault="qualified"
    attributeFormDefault="qualified">
    <xsd:import namespace=http://www.ibm.com/v1/etcML
        schemaLocation="etcml_redefines.xsd" />

<xsd:element name="esmML" type="etcML:etcRootType">               ⟵ 604
        <xsd:annotation>
            <xsd:documentation xml:lang="en-us">Root element for our new
            extended esm language.</xsd:documentation>
        </xsd:annotation>
    </xsd:element>

<xsd:complexType name="ESMResponseBodyType">
        <xsd:annotation>
            <xsd:documentation>ESM customized response Body</xsd:documentation>
        </xsd:annotation>
        <xsd:complexContent>
            <xsd:extension base="etcML:ResponseBodyType">     608
                <xsd:sequence>
                    <xsd:element name="RowSet" type="RowSetType"
                    minOccurs="0" maxOccurs="1" />
                    <xsd:element name="Properties"
                    type="PropertiesType" minOccurs="0" maxOccurs="1" />
                </xsd:sequence>
            </xsd:extension>                  610
        </xsd:complexContent>
    </xsd:complexType>

<xsd:complexType name="ParameterType">
        <xsd:complexContent>
            <xsd:extension base="etcML:ParameterType">  614
                <xsd:sequence>
                    <xsd:element ref="etcML:RequestedFields" minOccurs="1"
                    maxOccurs="1" />                     616
                    <xsd:element ref="etcML:StartRow" minOccurs="0"
                    maxOccurs="1" />
                    <xsd:element ref="etcML:MaxRowCount" minOccurs="0"
                    maxOccurs="1" />                     618
                    <xsd:element ref="etcML:DisplayRowCount" minOccurs="0"
                    maxOccurs="1" />
                    <xsd:element name="RowSet" type="RowSetType"
                    minOccurs="0" maxOccurs="1" />
                </xsd:sequence>
            </xsd:extension>
        </xsd:complexContent>
    </xsd:complexType>
```

FIG. 6B

```
      ┌ <xsd:complexType name="PropertiesType">
      │     <xsd:complexContent>
      │         <xsd:extension base="etcML:TicketingRecordSetType">
      │             <xsd:sequence maxOccurs="unbounded" minOccurs="1">
620 ┤                 <xsd:element name="Property" type="FieldType" />
      │             </xsd:sequence>                                    \
      │         </xsd:extension>                                        622
      │     </xsd:complexContent>
      └ </xsd:complexType>

┌ <xsd:complexType name="RowSetType">
      │     <xsd:complexContent>
      │         <xsd:extension base="etcML:TicketingRecordSetType">
      │             <xsd:sequence maxOccurs="unbounded" minOccurs="1">
      │                 <xsd:element name="Row" type="RowType" />
628 ┤             </xsd:sequence>              ⌐629
      │             <xsd:attribute name="name" type="xsd:string" />
      │         </xsd:extension>
      │     </xsd:complexContent>
      └ </xsd:complexType>

┌ <xsd:complexType name="FieldType"> 624
      │     <xsd:sequence>
623 ┤         <xsd:element name="name" type="xsd:string" />
      │         <xsd:element name="value" type="xsd:string" />
      │     </xsd:sequence>                               \
      └ </xsd:complexType>                                626

632
      ┌ <xsd:complexType name="RowType">                /
      │     <xsd:sequence minOccurs="0">
      │         <xsd:element name="Column" type="ColumnType" minOccurs="0"
      │ maxOccurs="unbounded" />
630 ┤         <xsd:element name="RowSet" type="RowSetType" minOccurs="0"
      │ maxOccurs="unbounded" />                         \
      │     </xsd:sequence>                              634
      │     <xsd:attribute name="name" type="xsd:string" />
      │     <xsd:attribute name="rowNumber" type="xsd:positiveInteger" />
      └ </xsd:complexType>

┌ <xsd:complexType name="ColumnType">
      │     <xsd:complexContent>
      │         <xsd:extension base="FieldType">          638
      │             <xsd:sequence>                         /
636 ┤                 <xsd:element name="enums" type="EnumsType" minOccurs="0" />
      │                 <xsd:element name="metadata" type="MetadataType" minOccurs="0" />
      │             </xsd:sequence>
      │         </xsd:extension>
      │     </xsd:complexContent>
      └ </xsd:complexType>

┌ <xsd:complexType name="EnumsType">
      │     <xsd:sequence maxOccurs="unbounded" minOccurs="1">
640 ┤         <xsd:element name="enum" type="xsd:string" />
      │     </xsd:sequence>
      └ </xsd:complexType>
```

FIG. 7A

```xml
<?xml version="1.0" encoding="UTF-8"?>
<xsd:schema xml:lang="en-us" version="1.0" elementFormDefault="unqualified"
xmlns:xsd="http://www.w3.org/2001/XMLSchema" attributeFormDefault="unqualified"
targetNamespace="http://www.ibm.com/v1/etcML"
xmlns="http://www.ibm.com/v1/etcML" xmlns:Q1="http://www.ibm.com/etc">
```
— 700

702 {
```xml
    <xsd:complexType name="etcRootType">                         704
        <xsd:sequence minOccurs="1" maxOccurs="1">
            <xsd:element name="Transactions" type="TransactionsContainerType"
            minOccurs="0" maxOccurs="1" />
        </xsd:sequence>
        <xsd:attribute name="ID" type="xsd:ID" use="optional" />
    </xsd:complexType>
```

706 {
```xml
    <xsd:complexType name="TransactionsContainerType">           708
        <xsd:choice minOccurs="1" maxOccurs="1">
            <xsd:element name="Request" type="TransactionRequestType"
            minOccurs="0" maxOccurs="1"></xsd:element>
            <xsd:element name="Response" type="TransactionResponseType"
            minOccurs="0" maxOccurs="1"></xsd:element>
        </xsd:choice>                                            710
    </xsd:complexType>
```

712 {
```xml
    <xsd:complexType name="TransactionRequestType">  714
        <xsd:complexContent>
            <xsd:extension base="TransactionType">            716
                <xsd:sequence>
                    <xsd:element name="SystemID" type="ProviderType"
                                 minOccurs="0"
                    maxOccurs="1"></xsd:element>
                    <xsd:element name="TransactionType"
                    type="ProviderActionType" minOccurs="1" maxOccurs="1">
                    </xsd:element>
                    <xsd:element name="Parameters"
                    type="ParameterType"></xsd:element>
                </xsd:sequence>
            </xsd:extension>                  718
        </xsd:complexContent>
    </xsd:complexType>
```

720 {
```xml
    <xsd:complexType name="TransactionType">
        <xsd:attribute name="userID" type="xsd:string" use="required" />
        <xsd:attribute name="password" type="xsd:string" use="optional" />
        <xsd:attribute name="timeStamp" type="xsd:dateTime" use="required" />
        <xsd:attribute name="languageCode" type="LanguageCodeType" use="required" />
        <xsd:attribute name="countryCode" type="CountryCodeType" use="required" />
        <xsd:attribute name="timeZone" type="TimeZoneType" use="required" />
    </xsd:complexType>
```

722 {
```xml
    <xsd:simpleType name="ProviderType">
        <xsd:restriction base="xsd:string">
            <xsd:enumeration value="e-ESM61"/>    724
            <xsd:enumeration value="e-ESM44"/>    726
        </xsd:restriction>
    </xsd:simpleType>
```

FIG. 7B

```
<xsd:complexType name="TransactionFilteredRequestType">
    <xsd:complexContent>
        <xsd:extension base="TransactionRequestType">
            <xsd:sequence>                          ~732
                <xsd:element ref="Filters" minOccurs="0"
                    maxOccurs="1"></xsd:element>
                                                        734
                <xsd:element ref="Sort" minOccurs="0"
                    maxOccurs="1"></xsd:element>
            </xsd:sequence>
        </xsd:extension>
    </xsd:complexContent>
</xsd:complexType>
```
730

```
<xsd:element name="Sort">
    <xsd:complexType>
        <xsd:sequence maxOccurs="1" minOccurs="1"
            <xsd:element ref="SortOrder" minOccurs="1"
                maxOccurs="unbounded" />
                                            738
        </xsd:sequence>
    </xsd:complexType>
</xsd:element>
```
736

```
<xsd:element name="SortOrder" type="SortOrderType" />
```

```
<xsd:complexType name="SortOrderType">
    <xsd:sequence minOccurs="1" maxOccurs="1">
        <xsd:element ref="Value" minOccurs="1"
            maxOccurs="1"></xsd:element>
        </xsd:sequence>                     744
        <xsd:attribute name="operator"
            type="SQLGroupByOperatorType"></xsd:attribute>
</xsd:complexType>
```
742

```
<xsd:element name="Value" type="xsd:string"></xsd:element>
```

```
<xsd:simpleType name="SQLGroupByOperatorType">
    <xsd:restriction base="xsd:string">     ~748
        <xsd:enumeration value="Ascending"></xsd:enumeration>
        <xsd:enumeration value="Descending"></xsd:enumeration>
    </xsd:restriction>
</xsd:simpleType>                           750
```
746

```
<xsd:element name="Filters">
    <xsd:complexType>                           754
        <xsd:sequence maxOccurs="unbounded">
            <xsd:element ref="Filter" minOccurs="0"
                maxOccurs="unbounded" />         756
            <xsd:element ref="Filters" minOccurs="0"
                maxOccurs="unbounded" />
        </xsd:sequence>                     758
        <xsd:attribute name="operator"
            type="SQLConditionJoinOperatorType" use="required" />
```
752

FIG. 7C

```
      ⎧ <xsd:simpleType name="SQLConditionJoinOperatorType">
      ⎪     <xsd:restriction base="xsd:string">
      ⎪         <xsd:enumeration value="And"> ─── 762
      ⎪         </xsd:enumeration>
760 ⎨         <xsd:enumeration value="Or"> ─── 764
      ⎪         </xsd:enumeration>
      ⎪     </xsd:restriction>
      ⎩ </xsd:simpleType>

<xsd:element name="Filter" type="FilterType" />

⎧ <xsd:complexType name="FilterType">
      ⎪     <xsd:sequence minOccurs="0" maxOccurs="unbounded">
      ⎪         <xsd:element ref="Value" minOccurs="1" maxOccurs="unbounded" />
      ⎪     </xsd:sequence>
768 ⎨     <xsd:attribute name="key" type="xsd:string" use="required" />
      ⎪     <xsd:attribute name="operator" type="SQLConditionOperatorType" ─── 770
      ⎪     use="required" />
      ⎩ </xsd:complexType>

⎧ <xsd:simpleType name="SQLConditionOperatorType">
      ⎪     <xsd:restriction base="xsd:string">
      ⎪         <xsd:enumeration value="Equal"> </xsd:enumeration>
      ⎪         <xsd:enumeration value="GreaterThan"> </xsd:enumeration>
      ⎪         <xsd:enumeration value="LessThan"> </xsd:enumeration>
      ⎪         <xsd:enumeration value="GreaterThanOrEqualTo"> </xsd:enumeration>
772 ⎨         <xsd:enumeration value="LessThanOrEqualTo"> </xsd:enumeration>
      ⎪         <xsd:enumeration value="NotEqualTo"> </xsd:enumeration>
      ⎪         <xsd:enumeration value="Like"> </xsd:enumeration>
      ⎪         <xsd:enumeration value="In"> </xsd:enumeration>
      ⎪         <xsd:enumeration value="Between"> </xsd:enumeration>
      ⎪         <xsd:enumeration value="NotIn"> </xsd:enumeration>
      ⎪         <xsd:enumeration value="NotBetween"> </xsd:enumeration>
      ⎪     </xsd:restriction>
      ⎩ </xsd:simpleType>

⎧ <xsd:complexType name="TransactionResponseType">
      ⎪     <xsd:complexContent>
      ⎪         <xsd:extension base="TransactionType">
      ⎪             <xsd:sequence minOccurs="1" maxOccurs="1">
      ⎪                 <xsd:element name="SystemID" type="ProviderType"
      ⎪                 minOccurs="0" maxOccurs="1"> </xsd:element>
      ⎪                 <xsd:element name="TransactionType"
      ⎪                 type="ProviderActionType" minOccurs="1"
      ⎪                 maxOccurs="1"> </xsd:element>
774 ⎨                 <xsd:element name="ErrorCode"
      ⎪                 type="ProviderErrorCodeType" ─── 778
      ⎪                 minOccurs="1" maxOccurs="1" />
      ⎪                 <xsd:element name="ResponseDescription"
      ⎪                 type="xsd:string" minOccurs="1" maxOccurs="1" />
      ⎪                 <xsd:element name="Body" type="ResponseBodyType"
      ⎪                 minOccurs="0" maxOccurs="1" /> ─── 776
      ⎪             </xsd:sequence>
      ⎪         </xsd:extension>
      ⎪     </xsd:complexContent>
      ⎩ </xsd:complexType>
```

```
<xsd:simpleType name="ProviderErrorCodeType">
    <xsd:restriction base="xsd:string">
        <xsd:enumeration value="0">                               /782
            <xsd:annotation>
                <xsd:documentation xml:lang="en-us">Successful    /784
                transaction</xsd:documentation>
            </xsd:annotation>
        </xsd:enumeration>
        <xsd:enumeration value="10000">    /786
            <xsd:annotation>
                    <xsd:documentation xml:lang="en-us">System
            788 — failure</xsd:documentation>
            </xsd:annotation>
        </xsd:enumeration>
    </xsd:restriction>
</xsd:simpleType>
```
780

```
</xsd:schema>
```

```
<?xml version="1.0" encoding="UTF-8"?>
<xsd:schema targetNamespace="http://www.ibm.com/v1/etcML"
xmlns:xsd="http://www.w3.org/2001/XMLSchema"
xmlns="http://www.ibm.com/v1/etcML" attributeFormDefault="unqualified"
elementFormDefault="unqualified">

<xsd:redefine schemaLocation="etcml.xsd">
    <xsd:simpleType name="ProviderActionType">
        <xsd:restriction base="ProviderActionType">
            <xsd:enumeration value="add" />
            <xsd:enumeration value="delete" />
            <xsd:enumeration value="get" />
            <xsd:enumeration value="list" />
            <xsd:enumeration value="validate" />
            <xsd:enumeration value="modify" />
        </xsd:restriction>
    </xsd:simpleType>

<xsd:simpleType name="ProviderErrorCodeType">
        <xsd:restriction base="ProviderErrorCodeType">
            <xsd:minInclusive>0</xsd:minInclusive>
            <xsd:maxInclusive>12000</xsd:maxInclusive>
        </xsd:restriction>
    </xsd:simpleType>
</xsd:redefine>
</xsd:schema>
```

*FIG. 8*

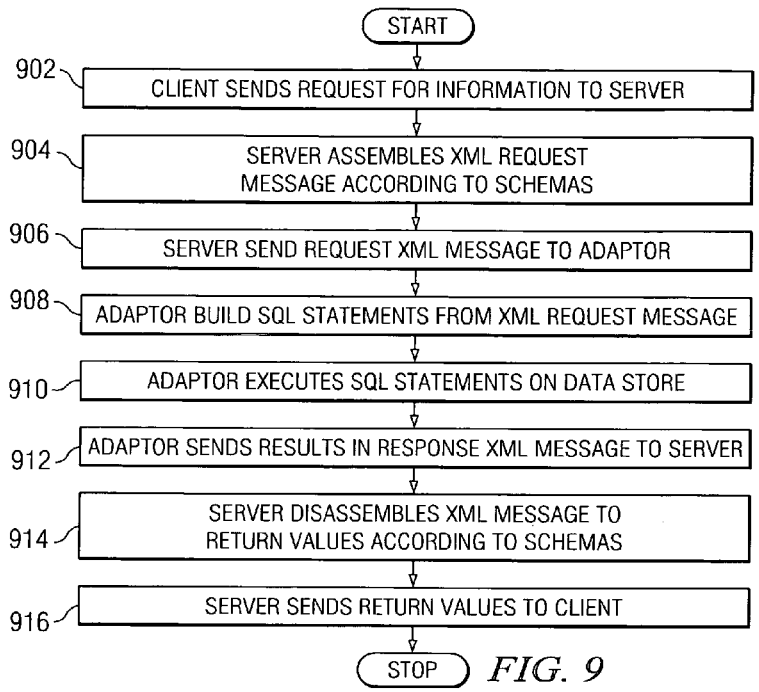

FIG. 9

```
<?xml version="1.0" encoding="UTF-8"?>
<esm:esmML xmins:xsi="http://www.w3.org/2001/XMLSchema-instance"
  xmlns:esm="http://www.ibm.com/esm" xmlns:etcML="http://www.ibm.com/v1/etcML" ID="1">
  <Transactions>
    <Request xsi:type="esm:ObjectRequestType" countryCode="fr" languageCode="FR"
    timeZone="" esm:agentID="EXAV" esm:userTrace="false">
      <SystemID>eESM630</SystemID>
      <TransactionType>list</TransactionType>
      <Parameters xsi:type="esm:ParameterType">
        <etcML:RequestedFields>
          <RequestedField>ProblemTicket.id</RequestedField>
          <RequestedField>ProblemTicket.Person.id</RequestedField>
        </etcML:RequestedFields>
        <etcML:StartRow>1</etcML:StartRow>
        <etcML:DisplayRowCount>10</etcML:DisplayRowCount>
      </Parameters>
      <etcML:Filters operator="AND">
        <etcML:Filter key="ProblemTicket.id" operator="NotEqualTo">
          <etcML:Value>L</etcML:Value>
        </etcML:Filter>
      </etcML:Filters>
      <esm:TransactionTarget>ProblemTicket</esm:TransactionTarget>
    </Request>
  </Transactions>
</esm:esmML>
```

FIG. 10

[11/14/03 15:55:57.057 CST] Servlet.Engine.Transports : 0:DEBUG  /1101
com.ibm.etc.cct.adapter.esm63.ejb.ESMAdapter63Bean.DataAccessManager - SQL
1102    1104    1106
Stmt:SELECT PROBLEMS.PROBLEM_ID, PROBLEMS.FIRST_PEOPLE_ID FROM
1108                                                                       1110
TSD630UC.PROBLEMS PROBLEMS WHERE 1=1 AND ( ( PROBLEMS.PROBLEM_ID <>?)
FETCH FIRST 201 ROWS ONLY

[11/14/03 15:55:57.057 CST] Servlet.Engine.Transports : 0:DEBUG
com.ibm.etc.cct.adapter.esm63.ejb.ESMAdapter63Bean.DataAccessManager-
setParameters(List parameters, PreparedStatement iPS):Param Type: CHAR Value:L —1112

```
<?xml version="1.0" encoding="UTF-8"?>
<esm:esmML xmlns:xsi="http://www.w3.org/2001/XMLSchema-instance"                     /1120
1122\    xmlns:esm="http://www.ibm.com/esm" ID="1">
  1124\   <Transactions>
          <Response xsi:type="esm:ObjectResponseType" countryCode="fr" language code="FR"
          timeStamp="2003-11-14T22:04:24Z" timeZone="">
              <SystemID>eESM630</SystemID>
                                                    /1128
    1132\   <TransactionType>list</TransactionType>
            <ErrorCode>0</ErrorCode>  —1126
                                                             /1130
    1134\   <ResponseDescription>success</ResponseDescription>
    1136\   <Body xsi:type="esm:ObjectResponseBodyType">
            <esm:RowSet displayRowCount="10" fetchCount="201" maxRowCount="200"
            startRow="1" totalCount="200" esm:name="ProblemTicket">    /1137
      1138/  <esm:Row esm:name="ProblemTicket" esm:rowNumber="1">
        1139/  <esm:Column>
                  <esm:name>ProblemTicket.id</esm:name>  /1140
                  <esm:value>SITEA-00000034          </esm:value>\
               </esm:Column>                                         1142
               <esm:Column>
        1141/    <esm:name>ProblemTicket.Person.id</esm:name>\
                  <esm:value>470000003</esm:value>\            1144
               </esm:Column>                          1146
             </esm:Row>
             <esm:Row esm:name="ProblemTicket" esm:rowNumber="2">
               <esm:Column>
                  <esm:name>ProblemTicket.id</esm:name>
                  <esm:value>SITEA-00000089          </esm:value>
               </esm:Column>
      1148<    <esm:Column>
                  <esm:name>ProblemTicket.Person.id</esm:name>
                  <esm:name>470000003</esm:value>
               </esm:Column>
             </esm:Row>
          </esm:RowSet>
        </Body>
      </Request>
  </Transactions>
</esm:esmML>
```

*FIG. 11*

METHOD AND APPARATUS FOR GENERATING QUERY AND RESPONSE STATEMENTS AT RUNTIME FROM GENERIC REQUESTS

CROSS REFERENCE TO RELATED APPLICATIONS

The present invention is related to the following applications entitled "METHOD AND APPARATUS FOR VALIDATING AND CONFIGURING DATABASE TRANSACTION REQUESTS FROM MULTIPLE CLIENTS", Ser. No. 10/756,932, filed on Jan. 14, 2004, and "METHOD AND APPARATUS FOR SPLITTING AND MERGING REQUEST AND RESPONSE DATA AT RUNTIME", Ser. No. 10/803,630, filed on Mar. 18, 2004, assigned to the same assignee, and incorporated herein by reference.

BACKGROUND OF THE INVENTION

1. Technical Field

The present invention relates generally to an improved data processing system and, in particular, to a method and system for accessing objects in a data store. Still more particularly, the present invention relates to a method, apparatus, and computer instructions for generating query statements at run time from generic and abstract request and response messages without having knowledge of the data store.

2. Description of Related Art

With the rise of the Internet, the ease of information exchange is pertinent to any application that facilitates data transactions. Particularly, in a World Wide Web environment, where service providers and consumers meet to conduct business, the efficiency of storing and retrieving business data is important to the success of business transactions. Various solutions have been developed to facilitate information exchange and storage of business data.

One solution for data exchange uses an XML Extender. An XML Extender is a component of DB2 Universal Database, a product available from International Business Machine Corporation. XML Extender makes use of extensible markup language (XML), a markup language available from the World Wide Web Consortium (W3C), to generate requests for business objects in a data store. XML allows users to flexibly define the structure of a query using a set of XML schemas. XML schemas define a set of elements that an XML message should include in order to exchange information with a data store. Thus, an XML message must adhere to the XML schemas in order to interact with the data store.

However, the XML Extender requires a client application to have knowledge of the specific data store, for example, a table name and table column name, in order to send an XML query message. In addition, the client application is required to have the ability to issue a structured query language (SQL) statement to be executed against the data store. SQL is an industry standard for constructing database queries. Furthermore, the amount of code required to support the variety of actions performed on the object is large since each action in the XML query may be different.

Therefore, it would be advantageous to have a generic set of XML schemas and messages that are not data store specific. In addition, it would be advantageous to have a set of generic XML schemas that facilitate generation of SQL statements from an XML query that does not include a SQL statement.

SUMMARY OF THE INVENTION

The present invention provides a method, apparatus, and computer instructions for generating SQL statements at run time from generic and abstract XML request and response messages without having knowledge of the data store. In a preferred embodiment, the present invention provides a set of generic XML schemas that define a number of actions a client may perform on information for a given object. Actions may include add, get, delete, list, update, and validate. A client may send a generic request XML message to perform one of these actions to the adaptor, which then generates and executes SQL statements on the specific data store. The resulting values are returned from the data store to the adaptor in the form of a response XML message that adhere to the set of generic XML schemas. The resulting values are obtained from the response XML message and returned to the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a diagram illustrating example implementation of esmBase.xsd in accordance with a preferred embodiment of the present invention;

FIG. 6B is a diagram illustrating an example implementation of esmBase.xsd in accordance with a preferred embodiment of the present invention;

FIG. 7A is a diagram illustrating an example implementation of etcml.xsd in accordance with a preferred embodiment of the present invention;

FIG. 7B is a diagram illustrating an example implementation of etcml.xsd in accordance with a preferred embodiment of the present invention;

FIG. 7C is a diagram illustrating an example implementation of etcml.xsd in accordance with a preferred embodiment of the present invention;

FIG. 7D is a diagram illustrating an example implementation of etcml.xsd in accordance with a preferred embodiment of the present invention.

FIG. 8 is a diagram illustrating an example implementation of etcml_redefines.xsd in accordance with a preferred embodiment of the present invention;

FIG. 9 is a flowchart illustrating an exemplary process for generating SQL statements at runtime from generic XML request and response messages in accordance with a preferred embodiment of the present invention;

FIG. 10 is a diagram illustrating an example request using a request XML message in accordance with a preferred embodiment of the present invention; and FIG. 11 is a diagram illustrating an example generated SQL statement and a response using a response XML message depicted in accordance with a preferred embodiment of the present invention.

DETAILED DESCRIPTION OF THE PREFERRED EMBODIMENT

Figure 1:
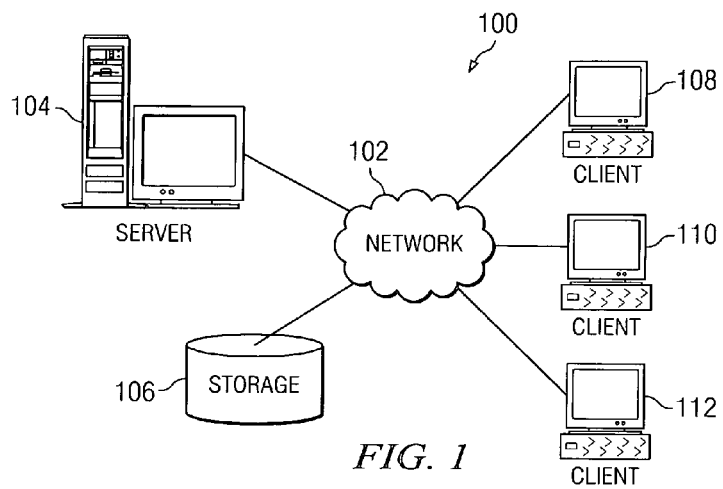
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102 These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
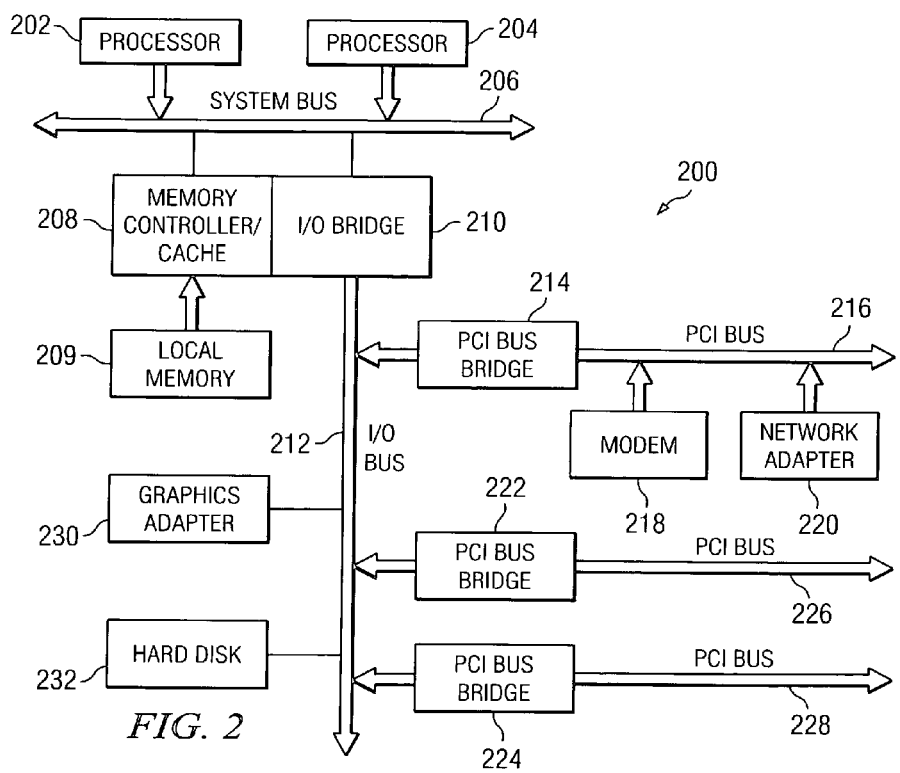
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
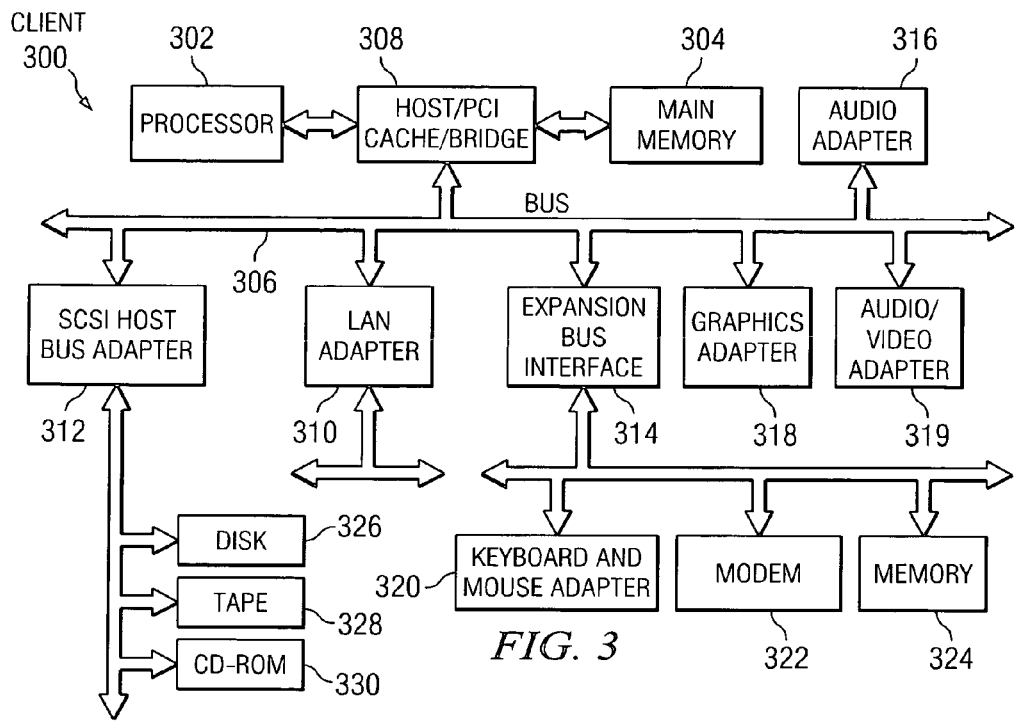
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus and computer instruction for generating an SQL statement from generic XML request and response messages. The present invention provides a set of generic XML schemas for generating SQL statements to retrieve or submit information to a specific data store without requiring a client application to have knowledge of how to access the data store. An example of a data store is DB2 Universal Database, a product available from International Business Machines Corporation.

An XML message of the present invention is defined using a set of generic XML schemas that are not data store specific. Thus, any client application may interact with any type of data store using the features of the present invention without the need of special XML schema definitions or application programming interfaces (APIs). Furthermore, the present invention supports complex objects, such as nested lists or nested objects. A nested object includes sub-objects. For example, a ProblemTicket object may include a ProblemTicket.Person sub-object.

In the present invention, each type of request to the data store includes only one business process and therefore reduces the amount of code required to support all other possible requests. For example, a request to get records from the data store for a specific object may be implemented using the same request XML message as a request to update the data store.

In a preferred embodiment, the present invention includes a set of generic XML schemas that define a number of actions a client application may perform on information for a given object. An object is a data entity that includes a set of attributes and subobjects. For example, a ProblemTicket is an object that includes attribute id and subobject Person. The object may be stored in a data store along with its attributes and subobjects. Using this set of generic XML schemas, the client application may send a request XML message to be processed by an adaptor. An adaptor generates and executes SQL statements against a data store to submit or retrieve information to or from the object. In an example implementation, the adaptor is a component of WebSphere Application Server for data access, which is a product available from International Business Machines Corporation. When results are returned from execution of the generated SQL statement, the adaptor returns the results using a response XML message that adheres to the generic XML schemas. The client application may obtain the results from the response XML message.

Examples of actions a client application may perform on objects include, for example, add, delete, get, list, modify, and validate. The "add" action creates a new record in the data store for the selected object. An object may be any object that includes a number of attributes. For example, an object may be a problem ticket that includes a number of attributes, such as id, call back date, etc. The "delete" action deletes an existing record for the selected object from the data store. The "get" action retrieves an existing record for the selected object from the data store. The "list" action returns a list of requested fields for objects that match the filter criteria. The "modify" action updates an existing record for the selected object. The "validate" action validates the selected object with a value using a condition operator.

Figure 4:
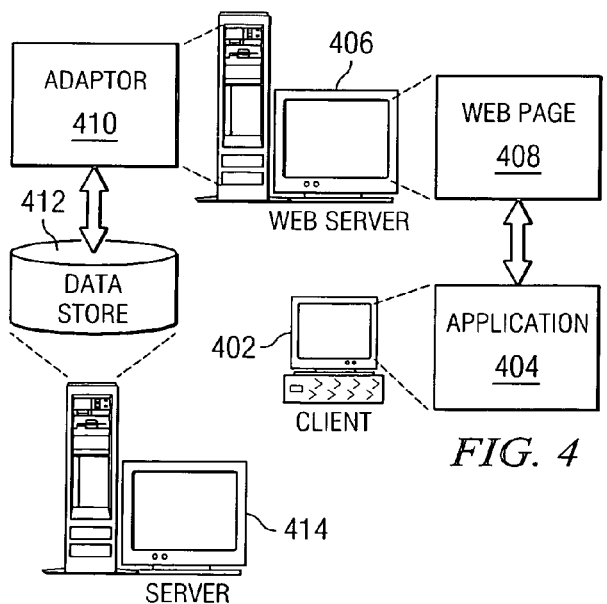
FIG. 4 is a diagram illustrating components used for generating SQL statements from generic and abstract XML request and response messages in accordance with a preferred embodiment of the present invention.

Turning now to FIG. 4, a diagram illustrating components used for generating SQL statements from generic XML request and response messages is depicted in accordance with a preferred embodiment of the present invention. As depicted in FIG. 4, client 402 may execute an application, such as application 404, to submit or retrieve information to or from Web page 408 that is stored in Web server 406. Client 402 may be implemented as data processing system 100 in FIG. 1 and Web server 406 may be implemented as server 104 in FIG. 1. An example of Web server 406 may be WebSphere Application Server, a product available from International Business Machines Corporation. Application 404 may be implemented as a Web browser, a Java application, a plugin to a Web browser or any other types of client applications.

Client 402 requests information, such as a problem ticket with a specific id, from application 404 to Web page 408. Web page 408 may request information from the adaptor 410, which interacts with data store 412, to retrieve information. Data store 412 may be implemented on server 414 or within Web server 406. In these examples, Web page 408 may be implemented as a servlet.

In conventional systems, in order to retrieve information from data store 412, Web page 408, which interprets a request from application 404, is required to include logic for specifying a particular data store 412 to which the request is directed. The logic specifying the data store includes a table name of the object requested, table column name for requested fields, etc. In addition, Web page 408 logic is required to include SQL for the request data in order to submit a query in a format that is understood by data store 412. In accordance with embodiments of the invention, logic for specifying the particular data store and SQL logic is not required to be included in Web page 408.

In this example implementation, Web server 406 includes an engine, adaptor 410, which is a set of APIs that interacts with data store 412 by generating and executing SQL statements using parameters provided by client 402 through web page 408. Adaptor 410 is a data access framework provided by WebSphere Application Server in these illustrated examples. Using the features of the present invention, upon receipt of a request from application 404, logic of Web page 406 in Web server 408, which interprets the request from application 404, assembles a request XML message that is defined by a set of generic XML schemas. The set of generic schemas identifies the type of requests, the requested fields of the object and any other parameters required to generate an SQL statement. Upon completion of the assembly, logic of Web page 408 may forward the request XML message to adaptor 410, which then generates and executes an SQL statement using values of the request XML message.

Once information is retrieved from data store 412, adaptor 410 returns the information to logic of Web page 408 in a form of a generic response XML message. Logic of Web page 408 then disassembles the values in the response XML message into a response to application 404 on client 402. Thus, using the features of the present invention, logic of Web page 408 may request information from a specific type of data store without specifying the data store or SQL-formatted request data.

Figure 5:
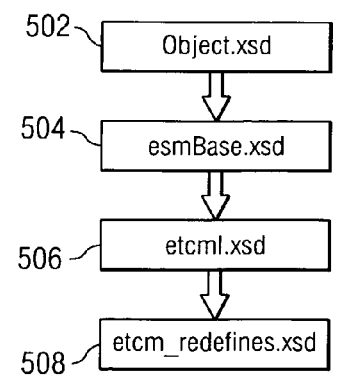
FIG. 5 is a diagram illustrating a set of XML schemas used for generating SQL statements in accordance with a preferred embodiment of the present invention.

Turning next to FIG. 5, a diagram illustrating a set of XML schemas used for generating SQL statements is depicted in accordance with a preferred embodiment of the present invention. As depicted in FIG. 5, the present invention includes a plurality of schemas including schema object.xsd 502, which describes the structure of a transaction. A transaction may include a request type, a response type and a response body, all of which are elements defined in the schema esmBase.xsd 504. Schema esmBase.xsd 504 defines what a request or response consists of. For example, a response may include a number of rows, which define names of objects requested. Additionally, rows may be nested. Within each row, there are a number of columns, which define names of the requested fields within objects requested. Within each column, there may be a number of enums, which return a number of options, such as options for a drop down box in a user interface. Schema esmBase.xsd 504 includes and extends elements defined in schema etcml.xsd 506. Hence, etcml.xsd 506 is the parent of esmBase.xsd 504.

Schema etcml.xsd 506 defines the core structure for an etcML based language. In the context of the present invention, an etcML based language is a language used to define structures of all allowed transactions. For example, schema etcml.xsd 506 includes an etcRootType, which is an element that defines a collection of transactions that a client, such as client 402 in FIG. 4, may perform over a set of generic request and response XML messages. For each transaction, at most one request or response is present. A response is defined by TransactionResponseType and a request is defined by TransactionRequestType. These types are described in further details in FIGS. 6A, 6B, 7A, 7B, 7C and 7D.

For each transaction type, a ProviderActionType is defined for actions available for each transaction to perform. Example actions for a transaction type include, add, delete, get, list, validate, and modify. ProviderActionType is defined in schema etcml_redefine.xsd 508, which may easily be modified. A set of error messages for a response may also be defined by using a ProviderErrorCodeType, which is also defined in schema etcml_redefined.xsd 508.

Turning now to FIG. 6A, a diagram illustrating an example implementation of schema esmBase.xsd 600 is depicted in accordance with a preferred embodiment of the present invention. As depicted in FIG. 6A, in this example implementation, schema esmBase.xsd 600 defines the structure of a request or response. EsmML 602 is the root element extended from the etcRootType 604 defined in schema etcml.xsd. etcRootType 604 represents a collection of transactions. If the transaction is a response XML message, the response XML message includes a body, defined by ESMResponseBodyType 606. ESMResponseBodyType 606 includes a RowSetType element 608 and a PropertiesType 610, both of which are described in further details in FIG. 6B. In addition, schema esmBase.xsd 600 includes a ParameterType 612, which is extended from schema ectml.xsd 506. ParameterType 612 defines a number of parameters that a client may request through a request XML message, such as, for example, a number of RequestedFields 614, Start Row number 616, Display Row Count 618, etc.

Turning next to FIG. 6B, a diagram illustrating an example implementation of esmBase.xsd is depicted in accordance with a preferred embodiment of the present invention. FIG. 6B is a part of esmBase.xsd in continuation of FIG. 6A. As depicted in FIG. 6B, in this example implementation, a response includes a PropertiesType 620, which includes FieldType 622, represented by block 623. FieldType 623 specifies name 624 and value 626 of a RequestedField, which is originally requested by the client in FIG. 6A. For example, the name of a RequestedField may be a ProblemTicket.id and the value may be SITEA-00000034.

As described in FIG. 6A, in addition to PropertiesType 620, a response includes RowSetType 628, which includes a number of rows 629. RowSetType 628 may be used in the present invention as a response or as a request to perform add or modify actions for updating records of an object. Each row 629 within RowSetType 628 represents an object returned from the data store after meeting a certain criteria. The number of rows may be specified by the client using Start Row number 616 and Display Row Count 618 in FIG. 6A. Row 629 is depicted by RowType 630. RowType 630 includes a ColumnType 632 and a nested RowSetType 634. Thus, a row may be embedded within another row for nested objects.

ColumnType 632 represents a RequestedField requested by the client, such as ProblemTicket.id. In addition to a name and a value as described above, ColumnType 632 includes an enums, defined by EnumsType 638, represented in block 640. EnumsType 640 is used to provide a list of strings in a response XML message. For example, the list of strings may define options a user may choose in a drop down box of the user interface.

With reference to FIG. 7A, a diagram illustrating an example implementation of schema etcml.xsd is depicted in accordance with a preferred embodiment of the present invention. As depicted in FIG. 7A, schema etcml.xsd 700 is the parent schema of schema esmBase.xsd as described in FIGS. 6A and 6B. Schema etcml.xsd 700 includes etcRootType 702, which includes a number of transactions defined by TransactionsContainerType 704. TransactionContainerType 704, represented in block 706, may either be a request, represented by TransactionRequestType 708, or a response, represented by TransactionResponseType 710. TransactionRequestType 712 includes a TransactionType 714, which is represented in block 720. TransactionType 720 describes attributes of a transaction, such as, for example, userID and password required, timestamp of the transaction, language, country, and time zone of the transaction.

In addition to TransactionType 714, TransactionRequestType 712 also includes ProviderType 716. ProviderType 716 is represented in block 722, which defines all backend data store systems available. In this example, data store e-ESM61 724 and e-ESM44 726 are available for storing and retrieving information of an object.

With reference to FIG. 7B, a diagram illustrating an example implementation of etcml.xsd is depicted in accordance with a preferred embodiment of the present invention. FIG. 7B is part of etcml.xsd in continuation of FIG. 7A. As depicted in FIG. 7B, a client may send a custom request that includes built-in functionality, such as sorting and filtering, for the results of the request. This functionality is provided by TransactionFilteredRequestType 730.

TransactionFilteredRequestType 730 provides Sort 734 and Filters 732 functions. Sort 734 function is represented by block 736, which includes a SortOrderType 738. SortOrderType, represented by block 742, includes an attribute SQLGroupByOperatorType 744. SQLGroupByOperatorType 744, represented by block 746, allows the client to sort the results of the request in either ascending 748 or descending 750 order. This operator is part of an SQL statement that will be generated.

As described above, the client may also filter the results using Filters 732 function. Filters 732 is represented by block 752. Block 752 includes a number of Filter 754 and a required attribute of SQLConditionJoinOperatorType 758 both of which are described in further details in FIG. 7C. Unlike sorting, filtering may be nested. Therefore, Filters 756 is included within Filters 752.

With reference to FIG. 7C, a diagram illustrating an example implementation of etcml.xsd is depicted in accordance with a preferred embodiment of the present invention. FIG. 7C is part of etcml.xsd in continuation of FIGS. 7A and 7B. As described in FIG. 7B, Filters includes a SQLConditionJoinOpertorType 758 represented by block 760, which includes join operators And 762 or Or 764. The join operator becomes part of an SQL statement that will be generated by the adaptor.

In addition, Filter 754 in FIG. 7B is defined by Filter Type 768. Filter Type 768 includes a value, which is compared to a key using a condition operator. The condition operator is defined by SQLConditionOperatorType 770. SQLConditionOperatorType 770 is represented by block 772 and includes condition operators, such as equal, greater than, less than, less than or equal to, greater than or equal to, not equal to, etc. For example, a client may send a request to retrieve information for a ProblemTicket.id that is not equal to L. ProblemTicket.id is the object key, L is the value, and not equal to is the condition operator. The key, value and the condition operator are also part of the SQL statement that will be generated by the adaptor.

Thus far we have discussed what a request XML message consists of. We now turn to a discussion of a response XML message. A response is defined by TransactionResponseType 774. TransactionResponseType 774 similar to TransactionRequestType 712 in FIG. 7A, also includes a TransactionType and a ProviderType. However, TransactionResponseType 774 also includes a body, defined by ResponseBodyType 776, which is extended by ESMResponseBodyType 706 in FIG. 7A. Moreover, TransactionResponseType 774 includes ErrorCode 778.

With reference to FIG. 7D, a diagram illustrating an example implementation of etcml.xsd is depicted in accordance with a preferred embodiment of the present invention. FIG. 7D is part of etcml.xsd in continuation of FIG. 7C. ErrorCode 778 shown in FIG. 7C is defined by block 780. ProviderErrorCodeType 780 describes a set of error messages that may be returned to the client in a response. A default value 782 of 0 may be returned for a successful response and default value 786 of 10000 may be returned for a system failure 788. The client may further customize the error messages using etcml_redefines.xsd schema, which is described in further details in FIG. 8.

Turning now to FIG. 8, a diagram illustrating an example implementation of etcml_redefines.xsd is depicted in accordance with a preferred embodiment of the present invention. As depicted in FIG. 8, etcml_redefines.xsd 800 includes ProviderActionType 820, which allows a client to perform a number of actions. In this example, clients are allowed to perform add, delete, get, list, validate and modify actions. These actions are described further below:

The add action creates a new record for the selected object. The object is unlocked once it is created to allow modification.

The delete action deletes an existing record for the selected object. For example, a ProblemTicket.Person object or objects within ProblemTicket may be deleted. The get action allows a client to retrieve an existing record for the selected object. If no object matches the criteria, an error code of 0 is returned. Results of a get action may include nested objects. Get action also provides a LockObject property to the recipient of the object, so that the object may be locked for update.

The list action returns a list of requested fields, such as ProblemTicket.id, after matching filter criteria of the request. If no object matches the criteria, an error code of 0 is returned. Similar to the get action, the list action may return nested objects.

The modify action allows a client to update an existing record for the selected object. An object has to be unlocked or already locked by the client in order to be modified.

The validate action applies a filter against an object key and a value using a condition operator, such as equal to, not equal to, etc. The error code is non-zero if the validation fails. If validation succeeds, the result includes the value of the object key, if the object key is case-insensitive. Thus, the client may obtain the actual value of the object key as it is a requested field.

Etcml_redefines.xsd 800 also includes a ProviderErrorCodeType 822, which defines a range of error codes to be returned to the client. In this example, a range of 0 to 12000 of valid error code values are allowed.

Turning next to FIG. 9, a flowchart illustrating an exemplary process for generating SQL statements at runtime from a generic XML request or response message is depicted in accordance with a preferred embodiment of the present invention. As depicted in FIG. 9, the process begins when the client, such as client 402 in FIG. 4, sends a request for information to the server (step 902). The server, such as Web server 408 in FIG. 4, assembles the XML request message (step 904) according the format defined by the generic XML schemas. Once the XML message is assembled, the server sends the request XML message to adaptor 410 (step 906).

Next, adaptor 410 generates an SQL statement using the values from the assembled XML message (step 908). Once the SQL statement is generated, the adaptor executes the SQL statement (step 910) against the data store to obtain the information. Once the result is returned from the data store, adaptor 410 sends the result to the server in a response XML message (step 912). The server then disassembles the response XML message into return values according to the set of generic schemas (step 914).

Finally, the server sends the return values to the client with the requested information (step 916). The process terminates thereafter.

Turning now to FIG. 10, a diagram illustrating an example XML request message is depicted in accordance with a preferred embodiment of the present invention. As depicted in FIG. 10, in this example implementation, request XML message 1000 includes a Transaction 1002. Transaction 1002 including a Request 1004 to perform a list action, as described by TransactionType 1006, against data store with SystemID 1008 of "eESM630". Request 1004 includes a set of Parameters 1010. Parameter 1010 includes an attribute parametertype 1011 defined by ParametersType 1011 in esmBase.xsd as described in FIGS. 6A and 6B.

Parameters 1010 includes two RequestedFields, namely ProblemTicket.id 1012 and ProblemTicket.Person.id 1014. Parameters 1010 also includes a StartRow 1016 with a value of 1 and a DisplayRowCount 1018 with a value of 10, which defines a request of rows 1 through 10 for the RequestedFields values. In this example, request 1004 is a custom request, which includes Filters 1020. Filters 1020 filters the results using condition join operator 'AND' 1022, a value 1024 of L, and a condition operator 1026 of "NotEqualTo" against the object key of ProblemTicket.id 1026.

Turning to FIG. 11, a diagram illustrating an example generated SQL statement and a response using a response XML message is depicted in accordance with a preferred embodiment of the present invention. As depicted in FIG.

11, in this example implementation, the SQL statement generated by the adaptor from request 1004 in FIG. 10 is shown as SQL statement 1101.

Statement 1101 is a SELECT clause, where the table name for ProblemTicket is Problems 1102. The column name of requested field ProblemTicket.id 912 in FIG. 9 is PROBLEM_ID 1104 and the column name of requested field ProblemTicket.Person.id 914 in FIG. 9 is FIRST_PEOPLE_ID 1106. In addition, the real data store name is TSD630UC 1108, as opposed to eESM630 908 in FIG. 9. The WHERE clause includes filtering of PROBLEM_ID 1110 against the value of 'L' 1112.

After adaptor executes statement 1101, a response is returned using response XML message 1120. Response XML message 1120 includes Transactions 1122. Transactions 1122 includes Response 1124 for a list action, as described by TransactionType 1126, against data store with SystemID "eESM630" 1128. Response 1124 is successful as described by ResponseDescription 1130 with an ErrorCode 1132 of 0. Within Response 1124, a Body 1134 includes a RowSet 1136, with a fetch count of 201. The fetch count indicates the number of records returned in this object, in this example, the object is the ProblemTicket 1137. Next, each record is represented by a Row 1138. Within Row 1138, there are 2 columns, column 1139 and column 1141.

Column 1139 includes name 1140 and a value 1142. Name 1140 represents ProblemTicket.id, which is the RequestedField. Value 1142 represents 'SITEA-00000034', which is returned from the data store.

Column 1141 also includes name 1144 and value 1146. Name 1144 represents ProblemTicket.Person.id, which is another RequestedField. Value 1146 represents 470000003, which is returned from the data store. Block 1148 represents the second record of the result returned from the data store.

Thus, using the generic and abstract XML request and response messages of the present invention, a client may interact with the data store to retrieve or submit information about an object without knowledge of how to access or interact with the data store. In addition, the present invention supports different types of data store without requiring development of a special XML schema definition or APIs. Furthermore, the present invention supports complex objects, such as nested lists or nested objects. The generic nature of the XML schemas reduces the amount of code required to support other possible requests.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a query statement at run time to submit and retrieve information of an object in a data store, the method comprising:
    receiving a request from a client to perform an action on the object in the data store;
    responsive to receiving the request, sending an extensible markup language request message to an adaptor for processing, wherein the extensible markup language request message adheres to a set of generic schemas including a plurality of row sets, wherein a row set includes a plurality of rows and wherein a row of the plurality of rows includes a plurality of columns, wherein a column includes a name and a value;
    receiving an extensible markup language response message from the adaptor, wherein the extensible markup language response message adheres to the set of generic schemas; and
    responsive to receiving the extensible markup language response message, returning resulting values obtained from the response message to the client.

2. The method of claim 1, wherein the action includes one of adding, deleting, getting, listing, updating, and validating the object in the data store.

3. The method of claim 1, wherein the request is formatted independently from a structure of the data store.

4. The method of claim 1, wherein a row of the plurality of rows represents a record of the object in the data store.

5. The method of claim 4, wherein the row includes a row set that represents a nested object.

6. The method of claim 1, wherein the name represents a name of the object.

7. The method of claim 6, wherein the value represents a value in the data store for the name of the object.

8. The method of claim 1, wherein the request message includes a plurality of parameters, filters, and sorts.

9. The method of claim 1, wherein the adaptor processes the request message by generating a query statement from the request message and executing the generated query statement on the data store.

10. The method of claim 1, wherein the request message, the response message, and the set of generic schemas are formatted using an extensible markup language.

11. A computer program product in a computer readable medium for performing actions on a data store, the computer program product comprising:
    first instructions for receiving a request in a first format for an action on an object in the data store;
    second instructions, responsive to processing the request, for generating an extensible markup language request message formatted according to a set of generic schemas including a plurality of row sets, wherein a row set includes a plurality of rows and wherein a row of the plurality of rows includes a plurality of columns, wherein a column includes a name and a value;
    third instructions for sending the request message to an adapter for processing and for receiving an extensible markup language response message formatted according to the set of generic schemas from the adapter; and
    fourth instructions that format result values of the response message in the first format.

12. The computer program product of claim 11, wherein a row of the plurality of rows represents a record of the object in the data store.

13. The method of claim 12, wherein the row includes a row set that represents a nested object.

14. The computer program product of claim 11, wherein the fourth instructions send the result values to a client that issued the request.

15. A data processing system for processing requests for actions on objects in a data store, comprising:
- a memory that contains a set of generic schemas as a singleton in-memory object, wherein the set of generic schemas includes a plurality of row sets, wherein a row set includes a plurality of rows, and wherein a row of the plurality of rows includes a plurality of columns, wherein a column includes a name and a value, and an adapter as a set of instructions; and
- a processing unit, responsive to execution of the set of instructions, for reading a request for an action on an object in the data store and generating an extensible markup language request message responsive to processing of the request, wherein the adapter receives the request message and executes a query on the data store responsive to processing the request message, and the adapter provides an extensible markup language response message responsive to receiving a result value from the data store.

16. The data processing system of claim 15, further comprising:
- a network adapter that receives the request from a client, wherein the extensible markup language response message is sent to the client by the network adapter.

17. The data processing system of claim 16, wherein the request is formatted independently of the data store.

\* \* \* \* \*